United States Patent
Hannu et al.

(10) Patent No.: US 9,332,550 B2
(45) Date of Patent: May 3, 2016

(54) CONTROLLING FAST DORMANCY

(75) Inventors: Hans Hannu, Luleå (SE); Jan Christoffersson, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 92 days.

(21) Appl. No.: 14/351,087

(22) PCT Filed: Jun. 5, 2012

(86) PCT No.: PCT/SE2012/050598
§ 371 (c)(1),
(2), (4) Date: Apr. 10, 2014

(87) PCT Pub. No.: WO2013/184050
PCT Pub. Date: Dec. 12, 2013

(65) Prior Publication Data
US 2014/0235257 A1    Aug. 21, 2014

(51) Int. Cl.
H04W 52/02    (2009.01)
H04W 76/04    (2009.01)
H04W 76/06    (2009.01)
H04W 72/04    (2009.01)

(52) U.S. Cl.
CPC ........ H04W 72/048 (2013.01); H04W 52/0225 (2013.01); H04W 76/046 (2013.01); H04W 76/068 (2013.01)

(58) Field of Classification Search
CPC ............ H04W 76/046; H04W 76/068; H04W 72/048; H04W 76/04; H04W 52/28
See application file for complete search history.

(56) References Cited

U.S. PATENT DOCUMENTS

| 6,275,712 | B1 | 8/2001 | Gray et al. |
| 2009/0129339 | A1* | 5/2009 | Young ............... H04W 72/02 370/331 |
| 2010/0302957 | A1 | 12/2010 | Ketheesan et al. |
| 2011/0216681 | A1 | 9/2011 | Tao et al. |

(Continued)

FOREIGN PATENT DOCUMENTS

| EP | 2560425 A1 | 2/2013 |
| EP | 2560432 A1 | 2/2013 |

(Continued)

OTHER PUBLICATIONS

Electronic Translation, Pub. No. JP2011-228805, Nov. 10, 2011, Aoyanagi et al.*

(Continued)

*Primary Examiner* — Marisol Figueroa
(74) *Attorney, Agent, or Firm* — Patent Portfolio Builders, PLLC

(57) ABSTRACT

A user equipment, UE, in a radio communication network is given a threshold time value that the UE uses to decide whether it should trigger a fast dormancy request to a network node or not. The determination of the threshold time value can be adapted so that it minimizes UE battery consumption when the load in the network node is low and at other times minimizes the load on the network node. That is, if the UE estimates that a predicted time interval until reception of a data burst is less than threshold time value it will not trigger a fast dormancy request, and if the estimated time interval is larger than the threshold time value it will trigger a fast dormancy request. Since the network typically controls state switching, there is a large benefit for the UE to comply with the scheme, otherwise the network may not obey the UEs wish to be down switched by the fast dormancy request.

18 Claims, 4 Drawing Sheets

(56) References Cited

U.S. PATENT DOCUMENTS

| | | | | |
|---|---|---|---|---|
| 2011/0250880 A1* | 10/2011 | Olsson | ................ | H04W 76/027 455/423 |
| 2012/0124196 A1 | 5/2012 | Brisebois et al. | | |
| 2013/0051227 A1* | 2/2013 | Aoyagi | ............ | H04W 52/0248 370/230 |
| 2013/0265925 A1* | 10/2013 | Tadaki | .............. | H04W 52/0258 370/311 |
| 2013/0329551 A1* | 12/2013 | Brisebois | .............. | H04W 4/001 370/230 |

FOREIGN PATENT DOCUMENTS

| | | | |
|---|---|---|---|
| EP | 2579673 A1 | 4/2013 | |
| JP | 2011228805 | 11/2011 | |
| WO | WO 2006/037377 | 4/2006 | |
| WO | 2012008886 A1 | 1/2012 | |
| WO | WO 2012/090615 | 7/2012 | |

OTHER PUBLICATIONS

PCT Notification Concerning Transmittal of International Preliminary Report on Patentability (Chapter 1 of the Patent Cooperation Treaty) for International application No. PCT/SE2012/050598, Dec. 9, 2014.

International Search Report for International Application No. PCT/SE2012/050598, Jun. 5, 2013.

"UE Battery Life Improvements and Signalling Reduction," 3GPP TSG-RAN WG2 Meeting #75bis Renesas Mobile Europe Ltd, Nokia Siemens Networks, R2-115322, F-06921, XP050540854, Oct. 10-14, 2011, pp. 1-6.

* cited by examiner

CONTROLLING FAST DORMANCY

PRIORITY

This nonprovisional application is a U.S. National Stage Filing under 35 U.S.C. §371 of International Patent Application Serial No. PCT/SE2012/050598, filed Jun. 5, 2012 and entitled "Controlling Fast Dormancy."

TECHNICAL FIELD

The field of the present disclosure is that of controlling transitions of operational states for a user equipment, UE, in a radio communication system.

BACKGROUND

The number of devices, and also the number of different types of devices, that are capable of communicating via radio interfaces with radio access networks is enormous, not least due to the rapid development of mobile telephone networks and wireless computer networks. Needless to say, such radio communication capable devices now include consumer electronic apparatuses of many kinds as well as devices in more industrial fields involving, for example, machine-to-machine communication.

A feature that is common to many of these types of devices is that they are powered by a very limited energy source such as a battery. An inherent problem to such devices is that of how to match the ever increasing demand for data processing capability with a limited capability of storing energy in the battery. One group of solutions to this problem involves the concept of operational states. That is, depending on the requirements of the device to provide processing capability it is possible to control the device to operate in two or more states that differ in terms of how much power is needed. For example, a device having a display screen may not need to actively display content during periods when no one is looking at the display screen. Another example is where it can be determined that processing circuitry or radio communication circuitry is not needed for specific time intervals, and therefore the device can be set to operate in a state where such circuitry is less active than in a normal state of activity.

This concept of operational states has been incorporated in radio access technologies such as the third generation partnership project, 3GPP, radio communication standards. Examples of these are the cellular wideband code division multiple access, WCDMA, and the long term evolution, LTE, technologies. Other systems such as the institute of Electrical and Electronics Engineers', IEEE, 802.11 standards also include a power save mode.

In 3GPP systems operating according to WCDMA and LTE the different states are called radio resource control, RRC, states and include an idle state and connected states. In WCDMA there are five RRC states; Cell_DCH, Cell_FACH, URA_PCH, Cell_PCH, and Idle. Data transfer between a device, which often is denoted by the term user equipment or simply UE, and the network is only possible in Cell_FACH and Cell_DCH states.

The Cell_DCH state is characterized by dedicated channels in both the uplink and the downlink. The UE location is known with an accuracy of cell level. This corresponds to continuous transmission and reception and this state has the highest battery consumption.

The Cell_FACH state does not use dedicated channels and hence less control channel overhead, thus allowing better battery consumption, but at the expense of a lower uplink and downlink throughput. The UE location is known with an accuracy of cell level.

URA_PCH and Cell_PCH are states in which the battery consumption is very low but still allow for reasonable fast transitions to the states in which data transfer can occur. The UE location is known with the accuracy of a so-called registration area, RA, or cell respectively, however paging is needed to reach the UE.

Idle have the lowest battery consumption but the transition from idle to a state in which data transfer can occur takes the longest time. The UE location is known with an accuracy of a so-called routing area.

FIG. 1a presents a state of the art RRC state transition scheme also referred to as channel switching scheme, as one is connect to different data channels in the states. The RRC state up-switches are typically based on radio link protocol, RLC, buffer fill level thresholds and the down-switches are typically based on inactivity timers.

In LTE systems, there are two RRC states: RRC_IDLE and RRC_CONNECTED, as shown in FIG. 1b, where the former corresponds to the idle state of WCDMA. The RRC_CONNCTED state corresponds to CELL_DCH of WCDMA and has three modes, continuous reception, short DRX and long DRX where DRX stands for discontinuous reception. Hence, RRC_IDLE has the lowest battery consumption and varying consumption in RRC_CONNECTED depending on the mode configuration.

User equipment that operates according to release 7 or earlier of the 3GPP standard specifications may send a signal connection release message to force itself to RRC Idle state. This is referred to as fast dormancy. Hence, the UE may have its own internal down-switch timer which is shorter than the network down-switch timers. This is done without the control of the network.

An improvement to this is done in 3GPP release 8. The release 8 fast dormancy solution allows the UE to signal to the network that the data transmission is completed. However, in the release 8 fast dormancy the network controls the down-switch of the UE and can decide to move the UE to another RRC state than idle for example URA_PCH or not to down-switch at all.

The triggering of fast dormancy from the UE may be based on different inputs. For example radio inactivity and screen status, i.e. whether a display screen is on or off. FIG. 2 gives an example of a fast dormancy triggering situation where the inactivity timer is set to 3 seconds, and also that the display screen needs to be off for at least 3 seconds. Both conditions need to be fulfilled to trigger fast dormancy.

There is always a trade of between the resource consumption, for example UE battery or processor load of a node in the network with which the UE communicates, of switching a UE from a connected state, e.g. CELL_DCH, CELL_FACH, to a standby state, e.g. CELL_PCH and URA_PCH, or staying in the connected state until next data burst is sent to or from the UE. Typically, a fast down-switch is beneficial for UE battery consumption while staying longer in the higher state is more beneficial for processor load in the network node.

The time between data bursts are referred to as the Idle Time Between bursts, or ITB. Hence, at a certain ITB length the cost (in consumed resources) is the same for staying on a given state or switching down and then up to the same state. This ITB is referred to as the threshold ITB.

With the increased number of UEs, particularly UEs in the form of so-called smart phones, operating in the radio networks the bottleneck has many times become the connection handling in the network nodes due to the heavy signaling the UEs have put to the network. The increased signaling is due to that the UEs want to be released from the network in order to save their battery by performing a fast dormancy, and the new applications made available to the mobile devices.

Even though the network has more control of which state to send the UE to with 3GPP release 8 supported fast dormancy, e.g. instead of the UE going to Idle the network may send the UE to URA_PCH, the fast dormancy signaling from many UEs are still expected to have a significant negative impact on the resource consumption, e.g. processor load in the network nodes, and downlink power and uplink interference.

The underlying problem is that fast dormancy requests from the UE are sent with the sole purpose of minimizing the UE battery consumption. The processor load in the network nodes is not taken into account by the UE, which may put a heavy burden on the network nodes, nor the resources in, e.g., radio base stations for performing the actual transmission of the signaling messages.

One type of prior art solution to this is described in co-pending U.S. patent application Ser. No. 13/322,982, where the network node load is taken into account. However, experience has shown that it is difficult to do accurate predictions of long ITBs (i.e. to detect when to down-switch) since the predictions are based only on information available in the network.

SUMMARY

In order to mitigate at least some of the drawbacks as discussed above, there is provided in a first aspect a method in a node for controlling transitions between operational states for a user equipment, UE, in a radio access network. The operational states comprises a first state and a second state and the method comprises determining a threshold time value for use by the UE in deciding whether or not to request switching from the first state to the second state, and transmitting the threshold time value to the UE.

The determination of the threshold time value can comprise obtaining a first resource consumption value representing resource consumption in the radio access network for residing in the first state, obtaining a second resource consumption value representing resource consumption in the radio access network for switching from the first state to the second state and residing in the second state. A threshold time value is then calculated that is indicative of when the first resource consumption value is equal to the second resource consumption value. The resource consumption values can, for example, be any of energy consumption in the UE, processor load in the node as well as radio bearer resources in the radio access network.

In a second aspect there is provided a method in a user equipment, UE, for controlling transitions between operational states for the UE in a radio access network. The operational states comprising a first state and a second state and the method comprises receiving, from a node in the radio access network, a threshold time value, obtaining a value representing a prediction of a time interval until reception of a data burst to be handled, and transmitting to the node, if the predicted time interval is larger than the received threshold value, a request for switching from the first state to the second state.

The method of the second aspect can further comprise determining, based on resource usage in the UE, whether or not a switch from the first state to the second state is desirable. In such cases, the transmission of the request for switching from the first state to the second state is further conditioned on this determination whether or not a switch from the first state to the second state is desirable. The resource usage can, for example, be any of display screen activity, battery energy level as well as radio circuitry activity.

In other words, the UE is given a threshold time value that the UE will use to decide whether it should trigger a fast dormancy request or not. This has an advantage in that the amount of signaling of fast dormancy requests is reduced. The determination of the threshold time value can be adapted so that it minimizes UE battery consumption when the load in the network node is low and at other times minimizes the load on the network node. That is, if the UE estimates that the prediction of a time interval until reception of a data burst is less than threshold time value it will not trigger a fast dormancy request, and if the prediction of a time interval until reception of a data burst is larger than the threshold time value it will trigger a fast dormancy request. Since the network typically controls state switching, there is a large benefit for the UE to comply with the scheme, otherwise the network may not obey the UEs wish to be down switched by the fast dormancy request.

In a third aspect there is provided a node for controlling transitions between operational states for a user equipment, UE, in a radio access network, the operational states comprising a first state and a second state. The node comprises control and communication circuitry configured to determine a threshold time value for use by the UE in deciding whether or not to request switching from the first state to the second state, and transmit the threshold time value to the UE.

In a fourth aspect there is provided a user equipment, UE, for controlling transitions between operational states for the UE in a radio access network, the operational states comprising a first state and a second state. The UE comprises control and communication circuitry configured to receive, from a node in the radio access network, a threshold time value, obtain a value representing a prediction of a time interval until reception of a data burst to be handled, and transmit to the node, if the predicted time interval is larger than the received threshold value, a request for switching from the first state to the second state.

In a fifth aspect and a sixth aspect there are provided computer program products comprising software instructions that, when executed in a processor, performs the method of the first and second aspects, respectively.

The effects and advantages of the third, fourth, fifth and sixth aspects correspond to those described above in connection with the first and second aspects.

DETAILED DESCRIPTION OF EMBODIMENTS

Figure 1A:
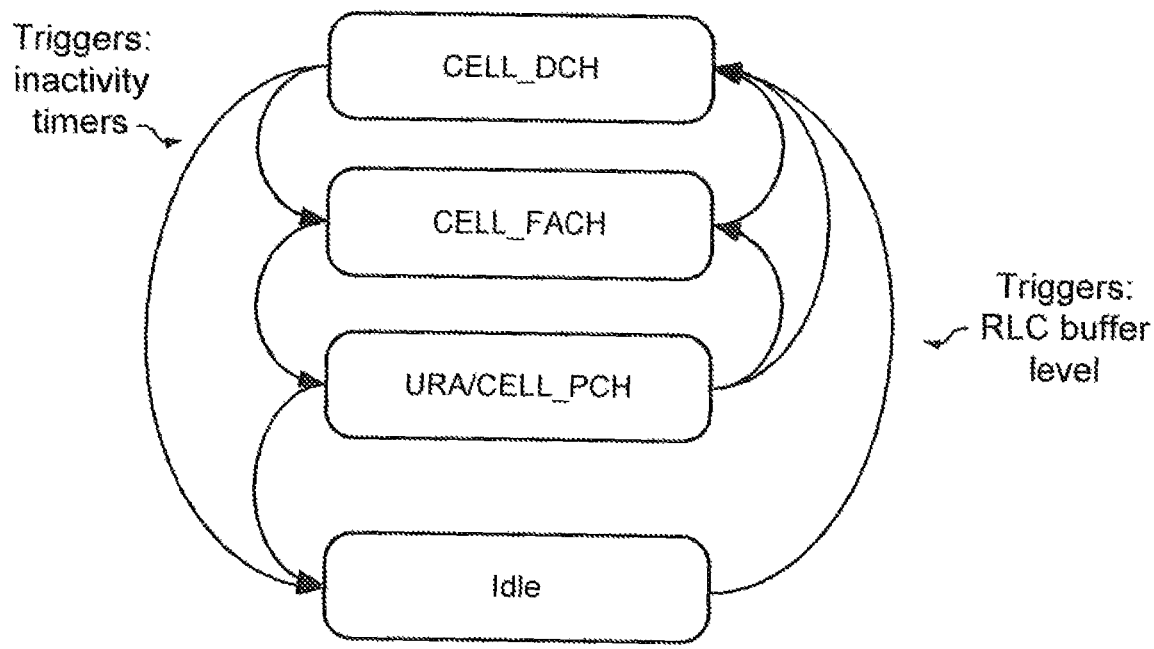
FIGS. 1a and 1b illustrate schematically RRC state switching.
Figure 1B:
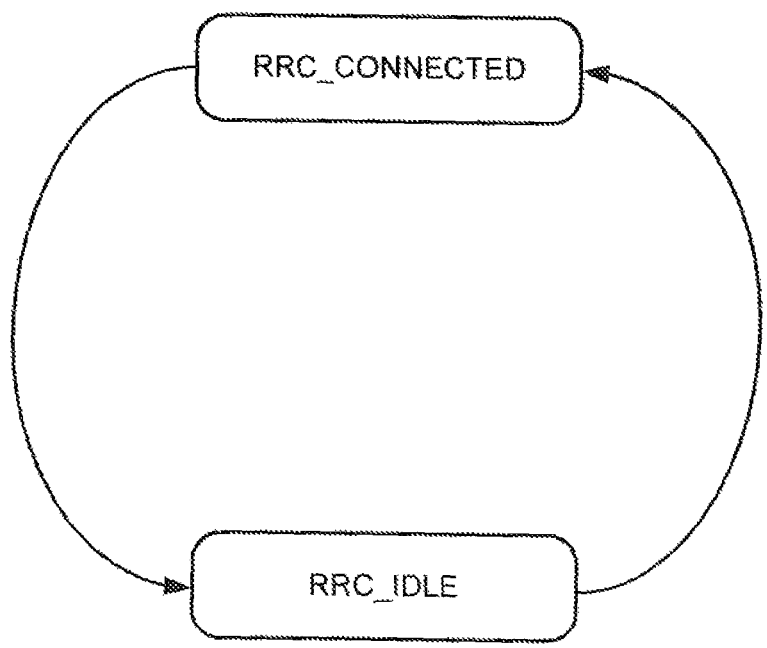
Figure 2:
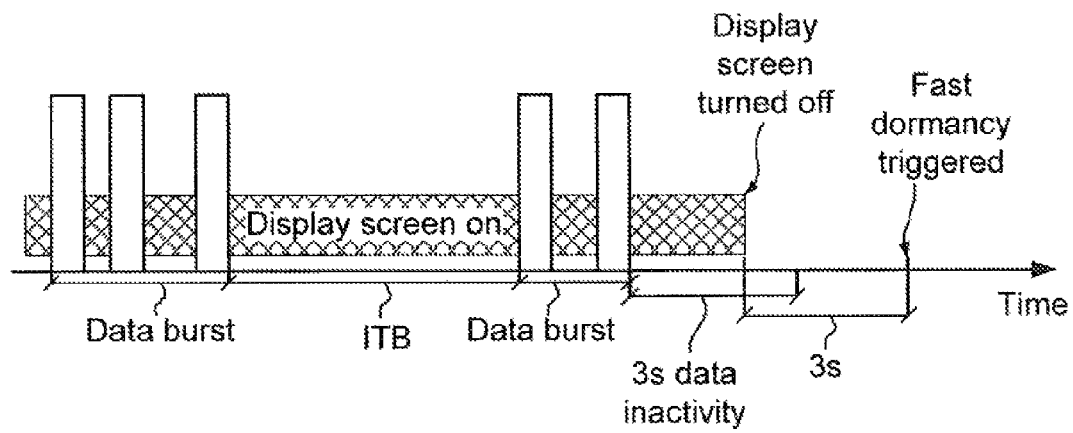
FIG. 2 is a timing diagram schematically illustrating data bursts and events in a UE.
Figure 3:
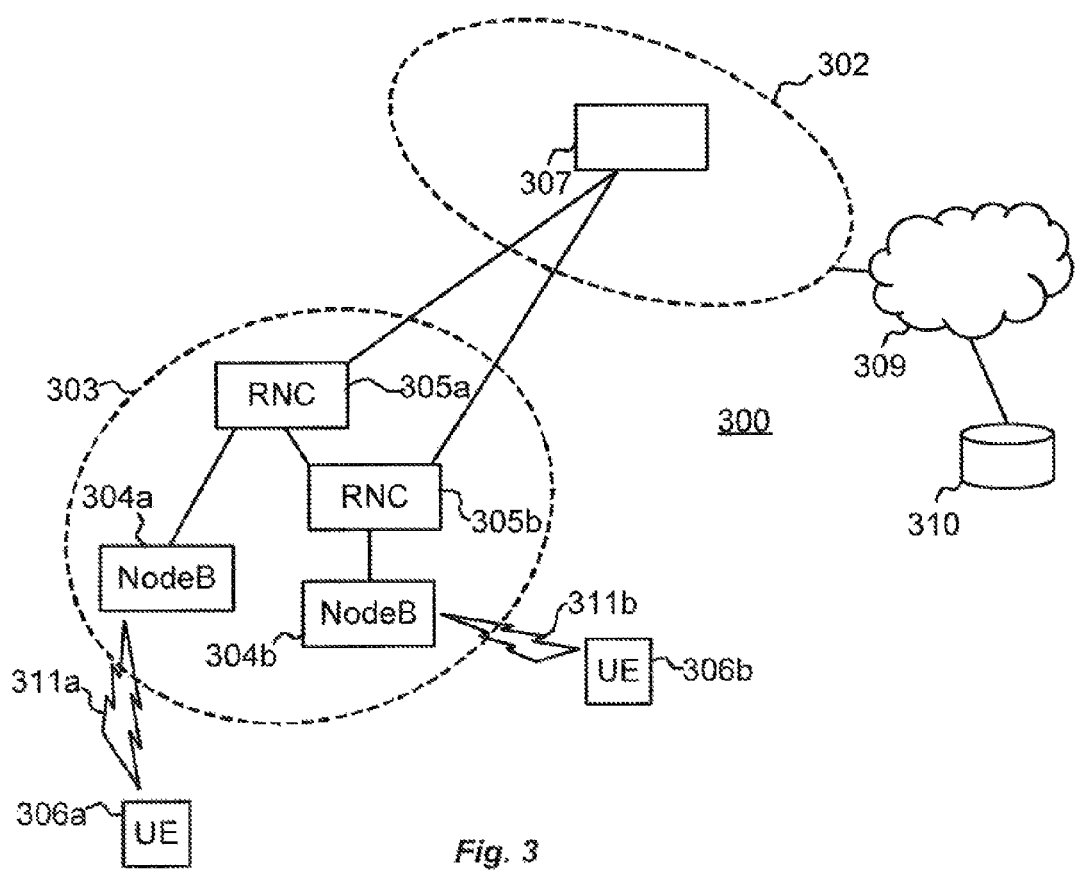
FIG. 3 illustrates schematically a communication system.

FIG. 3 illustrates schematically a communication system in the form of a universal mobile telecommunications system, UMTS, network 300 in which the present methods and apparatuses can be implemented. It should be noted, however, that the skilled person will readily be able to perform implementations in other similar communication systems involving transmission of coded data between nodes. For example, 3GPP compliant communication systems and IEEE 802.11 based communication systems.

In FIG. 3 the UMTS network 300 comprises a core network 432 and a UMTS terrestrial radio access network, UTRAN, 303. The UTRAN 303 comprises a number of nodes in the form of radio network controllers, RNC, 305a, 305b, each of which is coupled to a set of neighbouring nodes in the form of one or more NodeB 304a, 304b. Each NodeB 304 is responsible for a given geographical radio cell and the controlling RNC 305 is responsible for routing user and signalling data between that NodeB 304 and the core network 302. All of the RNC's 305 are coupled to one another. A general outline of the UTRAN 303 is given in 3GPP technical specification TS 25.401 V3.2.0.

FIG. 3 also illustrates communicating entities in the form of mobile devices or user equipment, UE, 306a, 306b connected to a respective NodeB 304a, 304b in the UTRAN 303 via a respective air interface 311a, 311b. Mobile devices served by one Node B, such as UE 306a served by NodeB 304a, are located in a so-called radio cell. The core network 302 comprises a number of nodes represented by node 307 and provides communication services to the UEs 306 via the UTRAN 303, for example when communicating with the Internet 309 where, schematically, a server 310 illustrates an entity with which the mobile devices 306 may communicate. As the skilled person realizes, the network 300 in FIG. 3 may comprise a large number of similar functional units in the core network 302 and the UTRAN 303, and in typical realizations of networks, the number of mobile devices may be very large.

Furthermore, as discussed herein, communication between the nodes in the UTRAN 303 and the mobile devices 306 may follow the protocols as specified by 3GPP high speed packet access, HSPA, specifications.

Figure 4:
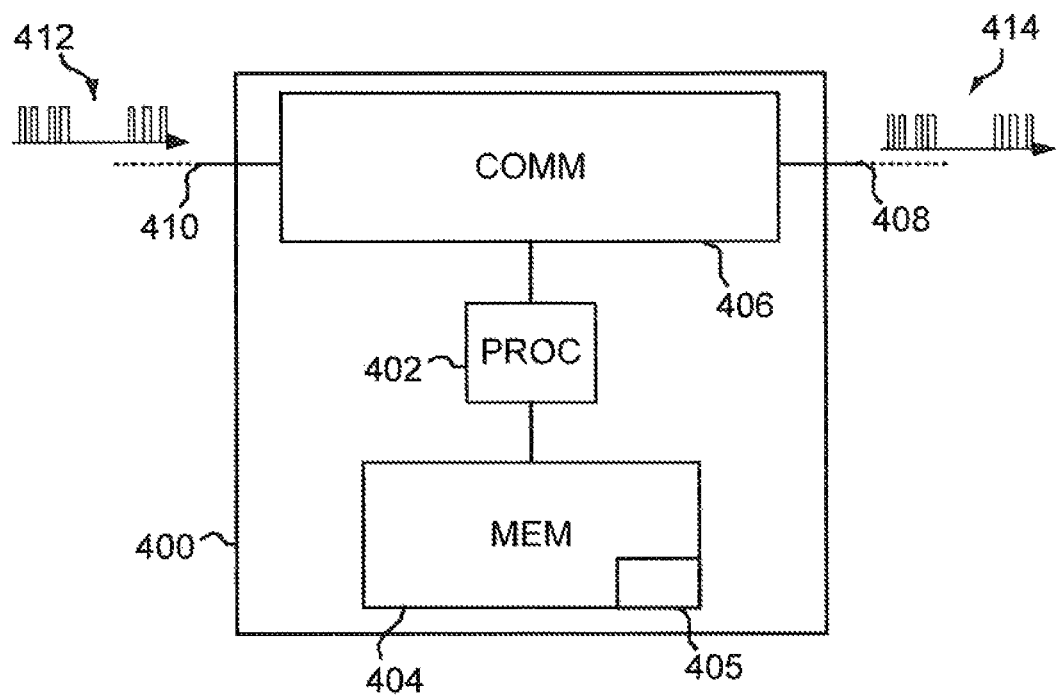
FIG. 4 illustrates schematically a node in a communication system.

FIG. 4 is a functional block diagram that schematically illustrates a node 400 that is configured to operate in a radio access network, such as the UTRAN 303 in FIG. 3. In the embodiment of FIG. 4, the node 400 represents a RNC, such as any of the RNC's 305 in FIG. 3.

The node 400 comprises processing means, memory means and communication means in the form of a processor 402, a memory 404 and communication circuitry 406. The node 400 receives data bursts 412 via an incoming data path 410 and transmits data bursts 414 via an outgoing data path 408. The data paths 410, 412 can be any of uplink and downlink data paths, as the skilled person will realize.

The methods to be described below can be implemented in the node 400. In such embodiments, the method actions are realized by means of software instructions 405 that are stored in the memory 404 and are executable by the processor 402. Such software instructions 405 can be realized and provided to the node 400 in any suitable way, e.g. provided via the networks 302, 303 or being installed during manufacturing, as the skilled person will realize. Moreover, the memory 404, the processor 402, as well as the communication circuitry 406 comprise software and/or firmware that, in addition to being configured such that it is capable of implementing the methods to be described, is configured to control the general operation of the node 400 when operating in a communication system such as the system 300 in FIG. 3. However, for the purpose of avoiding unnecessary detail, no further description will be made in the present disclosure regarding this general operation.

Figure 5:
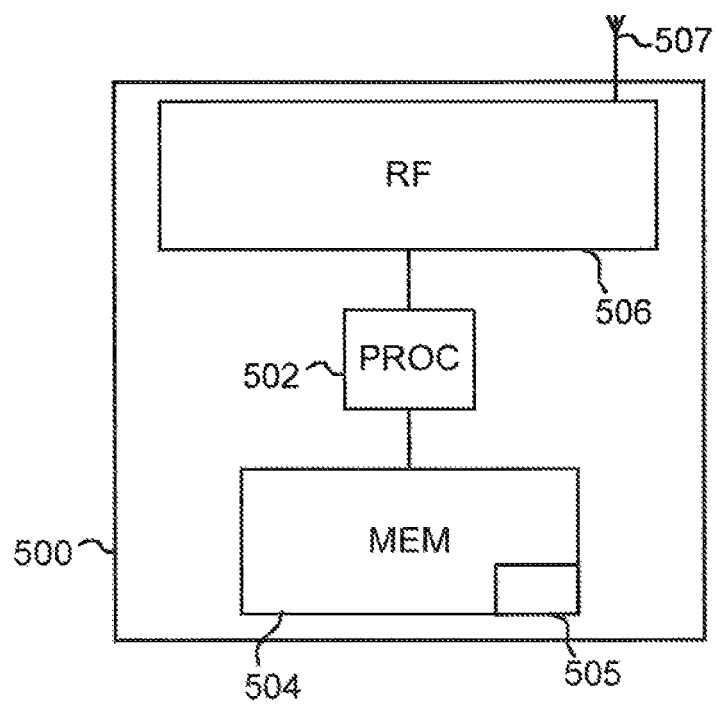
FIG. 5 illustrates schematically a UE in a communication system.

FIG. 5 is a functional block diagram that schematically illustrates a UE 500, corresponding to any of the UEs 306 in FIG. 3. The UE 500 comprises a processor 502, a memory 504, radio frequency, RF, receiving and transmitting circuitry 506 and an antenna 507. Radio communication via the antenna 507 is realized by the RF circuitry 506 controlled by the processor 502, as the skilled person will understand. The processor 502 makes use of software instructions 505 stored in the memory 504 in order to control all functions of the UE 200, including the functions to be described in detail below with regard to transition between operational states. In other words, at least the RF circuitry 506, the processor 502 and the memory 504 form parts of control and communication circuitry that is configured to control transition between operational states as summarized above and described in detail below. Further details regarding how these units operate in order to perform normal functions within a communication system, such as the system 300 of FIG. 3, are outside the scope of the present disclosure and are therefore not discussed further.

It is to be pointed out that, the UE 500 (as well as the UEs 306 in FIG. 3) may be any device, mobile or stationary, enabled to communicate over a radio channel in a radio communication network, for instance but not limited to e.g. terminal, mobile phone, smart phone, sensors, meters, vehicles, household appliances, medical appliances, media players, cameras, or any type of consumer electronic, for instance but not limited to television, radio, lighting arrangements, tablet computer, laptop, or PC.

Figure 6A:
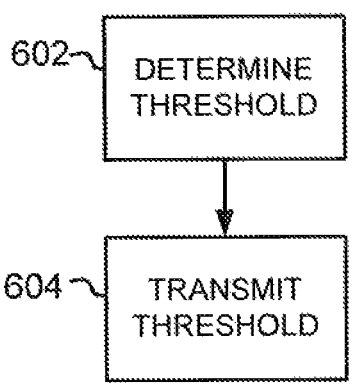
FIGS. 6a and 6b are flow charts of methods in a node and in a UE.
Figure 6B:
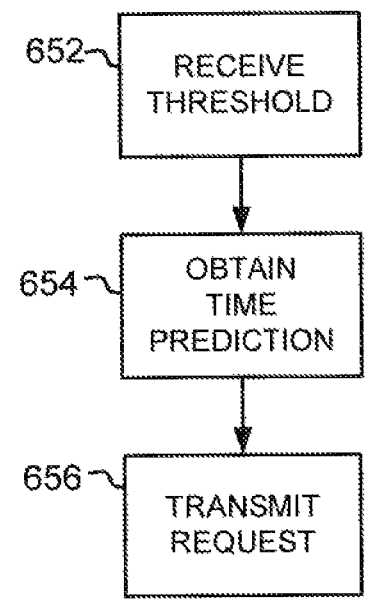

Turning now to FIGS. 6a and 6b, and with continued reference to the previous figures, methods for controlling transitions between operational states for a UE will be described in some more detail. FIG. 6a describes a method in a node, such as a RNC as illustrated by the RNCs 305 in FIG. 3 and the node 400 in FIG. 4. FIG. 6b describes a method in a UE, such as any of the UEs 306 in FIG. 3 and the UE 500 in FIG. 5. Although the methods of FIGS. 6a and 6b will be described separately it is to be understood that, being two aspects of a same concept, the methods operate in conjunction with each other.

The method in the node commences with a determination step 602 in which a determination is made of a threshold time value for use by the UE in deciding whether or not to request switching from the first state to the second state. The threshold time value is then transmitted to the UE in a transmission step 604.

The determination step 602 can be realized, for example, by a number of sub-procedures that include obtaining a first resource consumption value representing resource consumption in the radio access network for residing in the first state, and obtaining a second resource consumption value representing resource consumption in the radio access network for switching from the first state to the second state and residing in the second state. Then a calculation is made of the threshold time value that is indicative of when the first resource consumption value is equal to the second resource consumption value.

As mentioned above, the resource consumption values can, for example, be any of energy consumption in the UE, processor load in the node as well as radio bearer resources in the radio access network. Which of these resource consumption values to use depends on the specific load situation in the system. Typically, when the system load is moderate to high, greater emphasis can be put on, e.g., processor load in the node and when the system load is low, minimizing UE battery consumption can be prioritized. That is, the method in the node can comprise the following sequence of steps for selecting resource consumption values:

A value representing system load in the radio access network is obtained. Based on this value representing system load, a weighted selection is made of which resource consumption values to obtain such that when the system load is low, a value representing energy consumption in the UE is weighted higher than values representing processor load in the node and values representing radio bearer resources, and when the system load is high, a value representing energy consumption in the UE is weighted lower than values representing processor load in the node and values representing radio bearer resources.

When implementing the method in a node in a 3GPP WCDMA system, the first operational state can be any one of the RRC states CELL_DCH or CELL_FACH, and the second operational state can be any one of the RRC states URA_PCH, CELL_PCH or IDLE. When implementing the method in a node in a 3GPLTE system, the first operational state can be the RRC state RRC_CONNECTED, and the second operational state can be the RRC state RRC_IDLE. In such implementations, the transmission 604 of the threshold time value can be realized by performing RRC signaling using an information element containing the threshold time value. Alternatively, the transmission 604 of the threshold time value can be realized by way of providing the threshold time value such that it is readable by a software application running in the UE.

The method in the UE commences with a reception step 652 in which a threshold time value is received from the node. A prediction of a time interval until reception of a data burst to be handled is then obtained in an obtaining step 654. The prediction can be performed by using a prediction algorithm suitable for the specific implementation. Then, if the predicted time interval is larger than the received threshold value, a request for switching from the first state to the second state is transmitted to the node in a transmission step 656. There are several prediction or classification algorithms that can be useful for this application. A typical example is the J48 tree classifier.

The method in the UE can also comprise making a determination, based on resource usage in the UE, whether or not a switch from the first state to the second state is desirable. The transmission of the request for switching from the first state to the second state is then further conditioned on this determination whether or not a switch from the first state to the second state is desirable. The resource usage can be any of display screen activity, battery energy level as well as radio circuitry activity.

When implementing the method in a UE in a 3GPP WCDMA system, the first operational state can be any one of the RRC states CELL_DCH or CELL_FACH, and the second operational state can be any one of the RRC states URA_PCH, CELL_PCH or IDLE. When implementing the method in a UE in a 3GPLTE system, the first operational state can be the RRC state RRC_CONNECTED, and the second operational state can be the RRC state RRC_IDLE. In such implementations, the reception 652 of the threshold time value can be realized via RRC signaling using an information element containing the threshold time value. Alternatively, the reception 652 of the threshold time value can be realized by way of a software application running in the UE.

Similarly, in such 3GPP systems, the transmission of the request for switching from the first state to the second state can comprise performing RRC signaling of an information element containing the request for switching from the first state to the second state or causing a software application running in the UE to transmit the request for switching from the first state to the second state.

To summarize some advantages, at least for the implementations in the 3GPP WCDMA and LTE environments, it can be noted that due to the fact that the signaling message addition, i.e. the transmission of the threshold time value, is only required in the downlink, this makes this solution backwards compatible for previous released UEs.

Moreover, variations on the above described methods can include the use of two different threshold time values. That is, the node can determine and transmit two threshold time values, $CD\_T_{fd}$, and $CF\_T_{fd}$. The first to be used when the UE is in the CELL_DCH state and the second is to be used when the UE is in the CELL_FACH state. These two thresholds are then used by the UE to determine whether it should issue a fast dormancy request to the network. When the UE concludes that the current data burst has ended, by e.g. an empty RLC data buffer for a certain time period, and then if the UE predicts that it will have a data burst within $CD\_T_{fd}$ if the UE is currently in CELL_DCH, or $CF\_T_{fd}$ if the UE is currently in CELL_FACH, it should not issue a fast dormancy request. However, if the UE predicts that the time to next data burst is larger than these threshold time values it shall issue a fast dormancy request.

The invention claimed is:

1. A method for controlling transitions between operational states for a user equipment, UE, in a radio access network, the operational states comprising a first state and a second state, the method comprising:
   determining, by a node, a threshold time value wherein the determination of the threshold time value comprises:
   obtaining a first resource consumption value representing resource consumption in the radio access network for residing in the first state,
   obtaining a second resource consumption value representing resource consumption in the radio access network for switching from the first state to the second state and residing in the second state, and
   calculating the threshold time value that is indicative of when the first resource consumption value is equal to the second resource consumption value;
   transmitting, by the node, the threshold time value to the UE; and
   using, by the UE, the determined threshold time value for deciding whether or not to request switching from the first state to the second state.

2. The method of claim 1, wherein the resource consumption values are any of:
   energy consumption in the UE,
   processor load in the node, or
   radio bearer resources in the radio access network.

3. The method of claim 2, comprising:
   obtaining a value representing system load in the radio access network and,
   performing, based on the value representing system load, a weighted selection of which resource consumption values to obtain such that:
      when the system load is low, a value representing energy consumption in the UE is weighted higher than values representing processor load in the node and values representing radio bearer resources, and
      when the system load is high, a value representing energy consumption in the UE is weighted lower than values representing processor load in the node and values representing radio bearer resources.

4. The method of claim 1, wherein:
   the radio access network is a third generation partnership project, 3GPP, wideband code division multiple access, WCDMA, network,
   the first operational state is any one of the radio resource control, RRC, states CELL_DCH or CELL_FACH, and the second operational state is any one of the RRC states URA_PCH, CELL_PCH or IDLE.

5. The method of claim 1, wherein:
the radio access network is a third generation partnership project, 3GPP, long term evolution, LTE, network,
the first operational state is the radio resource control, RRC, state RRC_CONNECTED, and
the second operational state is the RRC state RRC_IDLE.

6. The method of claim 4, wherein the transmission of the threshold time value comprises:
performing RRC signaling using an information element containing the threshold time value.

7. The method of claim 1, wherein the transmission of the threshold time value comprises:
providing the threshold time value such that it is readable by a software application running in the UE.

8. A method in a user equipment, UE, for controlling transitions between operational states for the UE in a radio access network, the operational states comprising a first state and a second state, the method comprising:
receiving, from a node in the radio access network, a threshold time value,
obtaining a value representing a prediction of a time interval until reception of a data burst to be handled, and
transmitting to the node, when the predicted time interval is larger than the received threshold value, a request for switching from the first state to the second state.

9. The method of claim 8, further comprising:
determining, based on resource usage in the UE, whether or not a switch from the first state to the second state is desirable, and
wherein
the transmission of the request for switching from the first state to the second state is further conditioned on the determination whether or not a switch from the first state to the second state is desirable.

10. The method of claim 9, wherein the resource usage is any one of:
display screen activity,
battery energy level, or
radio circuitry activity.

11. The method of claim 8, wherein:
the radio access network is a third generation partnership project, 3GPP, wideband code division multiple access, WCDMA, network,
the first operational state is any one of the radio resource control, RRC, states CELL_DCH or CELL_FACH, and
the second operational state is any one of the RRC states URA_PCH, CELL_PCH or IDLE.

12. The method of claim 8, wherein:
the radio access network is a third generation partnership project, 3GPP, long term evolution, LTE, network,
the first operational state is the radio resource control, RRC, state RRC_CONNECTED, and
the second operational state is the RRC state RRC_IDLE.

13. The method of claim 11, wherein the reception of the threshold time value comprises:
receiving, via RRC signaling, an information element containing the threshold time value.

14. The method of claim 11, wherein the transmission of the request for switching from the first state to the second state comprises:
performing RRC signaling of an information element containing the request for switching from the first state to the second state.

15. The method of claim 8, wherein the reception of the threshold time value comprises:
receiving, in a software application running in the UE, the threshold time value.

16. The method of claim 8, wherein the transmission of the request for switching from the first state to the second state comprises:
causing a software application running in the UE to transmit the request for switching from the first state to the second state.

17. A system for controlling transitions between operational states for a user equipment, UE, in a radio access network, the operational states comprising a first state and a second state, the system comprising:
a node comprising control and communication circuitry configured to:
determine a threshold time value,
transmit the threshold time value to the UE;
wherein for the determination of the threshold time value, the control and communication circuitry is further configured to:
obtain a first resource consumption value representing resource consumption in the radio access network for residing in the first state,
obtain a second resource consumption value representing resource consumption in the radio access network for switching from the first state to the second state and residing in the second state, and
calculate the threshold time value that is indicative of when the first resource consumption value is equal to the second resource consumption value; and
the user equipment configured to:
use the determined threshold time value for deciding whether or not to request switching from the first state to the second state.

18. A user equipment, UE, for controlling transitions between operational states for the UE in a radio access network, the operational states comprising a first state and a second state, the UE comprising control and communication circuitry configured to:
receive, from a node in the radio access network, a threshold time value,
obtain a value representing a prediction of a time interval until reception of a data burst to be handled, and
transmit to the node, when the predicted time interval is larger than the received threshold value, a request for switching from the first state to the second state.

* * * * *